United States Patent

Hagiwara et al.

(10) Patent No.: US 8,990,926 B2
(45) Date of Patent: Mar. 24, 2015

(54) METHOD AND APPARATUS FOR PROTECTING A PASSWORD OF A COMPUTER HAVING A NON-VOLATILE MEMORY

(71) Applicant: Lenovo (Singapore) Pte. Ltd., Singapore (SG)

(72) Inventors: Mikio Hagiwara, Tokyo (JP); Eitaroh Kasamatsu, Kanagawa-ken (JP); Yasumichi Tsukamoto, Kanagawa-ken (JP); Naoyuki Araki, Kanagawa-ken (JP)

(73) Assignee: Lenovo (Singapore) Pte Ltd, Singapore (SG)

( * ) Notice: Subject to any disclaimer, the term of this patent is extended or adjusted under 35 U.S.C. 154(b) by 95 days.

(21) Appl. No.: 13/709,938

(22) Filed: Dec. 10, 2012

(65) Prior Publication Data

US 2013/0185789 A1  Jul. 18, 2013

(30) Foreign Application Priority Data

Jan. 15, 2012 (JP) .................. 2012-005717

(51) Int. Cl.
| | |
|---|---|
| G06F 21/00 | (2013.01) |
| G06F 21/45 | (2013.01) |
| G06F 1/32 | (2006.01) |
| G06F 21/88 | (2013.01) |

(Continued)

(52) U.S. Cl.
CPC ............. *G06F 21/45* (2013.01); *G06F 1/3203* (2013.01); *G06F 21/88* (2013.01); *G06F 21/554* (2013.01); *G06F 21/572* (2013.01)

USPC ........................................................ 726/18

(58) Field of Classification Search
CPC ...... G06F 21/88; G06F 1/3203; G06F 21/544
USPC ........................................................ 726/18
See application file for complete search history.

(56) References Cited

U.S. PATENT DOCUMENTS

| | | | | |
|---|---|---|---|---|
| 6,012,146 | A  * | 1/2000 | Liebenow | ........................ 726/17 |
| 7,103,909 | B1 * | 9/2006 | Kondo et al. | ..................... 726/2 |
| 7,213,139 | B2 | 5/2007 | Zhang | |

(Continued)

FOREIGN PATENT DOCUMENTS

| | | |
|---|---|---|
| JP | 2007-90845 | 4/2007 |
| JP | 2008-052704 | 3/2008 |

OTHER PUBLICATIONS

Open Sesame: Harddrive Password Hacking with a OpenBench Logic Sniffer; http://shackspace.de./?p=1976; accessed Nov. 7, 2014; posted Apr. 27, 2011.*

(Continued)

*Primary Examiner* — Luu Pham
*Assistant Examiner* — James Turchen
(74) *Attorney, Agent, or Firm* — Anthony P. Ng; Russell Ng PLLC

(57) ABSTRACT

A method for protecting a password of a computer having a non-volatile memory is disclosed. A password is stored in a non-volatile memory of a computer. The computer is then transitioned to a power saving state. In response to a detection of an unauthorized access to the non-volatile memory during the power saving state transition, a password input is requested from a user. The computer returns to a power-on state from the power saving state when there is a success in authentication of the input password.

8 Claims, 10 Drawing Sheets

(51) Int. Cl.
  *G06F 21/55* (2013.01)
  *G06F 21/57* (2013.01)

(56) References Cited

U.S. PATENT DOCUMENTS

| | | | |
|---|---|---|---|
| 7,367,063 B1* | 4/2008 | O'Toole, Jr. .................... 726/34 |
| 7,395,434 B2* | 7/2008 | Piwonka et al. .............. 713/183 |
| 7,685,634 B2* | 3/2010 | Tran et al. ....................... 726/16 |
| 7,814,321 B2* | 10/2010 | Challener et al. ............. 713/168 |
| 7,971,081 B2 | 6/2011 | Cooper et al. |
| 8,161,306 B2* | 4/2012 | Reece et al. ................. 713/320 |
| 8,281,114 B2* | 10/2012 | Linetsky ........................... 713/2 |
| 8,495,370 B2* | 7/2013 | Nimura et al. ............... 713/168 |
| 8,566,603 B2* | 10/2013 | Cox et al. ..................... 713/183 |
| 8,595,858 B2* | 11/2013 | Sakai ............................ 726/34 |
| 8,601,606 B2* | 12/2013 | Hafeman ....................... 726/34 |
| 2001/0011947 A1* | 8/2001 | Jaber et al. ................. 340/568.1 |
| 2003/0014660 A1* | 1/2003 | Verplaetse et al. ........... 713/200 |
| 2003/0120918 A1* | 6/2003 | VanDer Kamp .............. 713/164 |
| 2003/0149866 A1* | 8/2003 | Neuman et al. ..................... 713/1 |
| 2005/0177768 A1* | 8/2005 | Imamura ......................... 714/13 |
| 2007/0061879 A1* | 3/2007 | Dailey et al. .................... 726/19 |
| 2008/0120716 A1* | 5/2008 | Hall et al. ........................ 726/16 |
| 2010/0125908 A1* | 5/2010 | Kudo ............................... 726/19 |
| 2010/0131789 A1* | 5/2010 | Kimura ......................... 713/323 |
| 2011/0154478 A1* | 6/2011 | Chew ............................... 726/16 |
| 2011/0307724 A1* | 12/2011 | Shaw et al. .................... 713/323 |
| 2012/0124663 A1* | 5/2012 | Russo et al. ..................... 726/19 |
| 2012/0254623 A1* | 10/2012 | Sathath ......................... 713/183 |
| 2013/0173942 A1* | 7/2013 | Forristal et al. .............. 713/323 |

OTHER PUBLICATIONS

Advanced Configuration and Power Interface Specification; Revision 3.0b; Hewlett-Packard/Intel/Microsoft/Phoenix/Toshiba; Oct. 10, 2006.*

"Windows security one point lesson", No. 1 Risk of Hibernation, Jan. 21, 2014 URL: http://www.st.rim.or.jp/~shio/winsec/hibernation/.

* cited by examiner

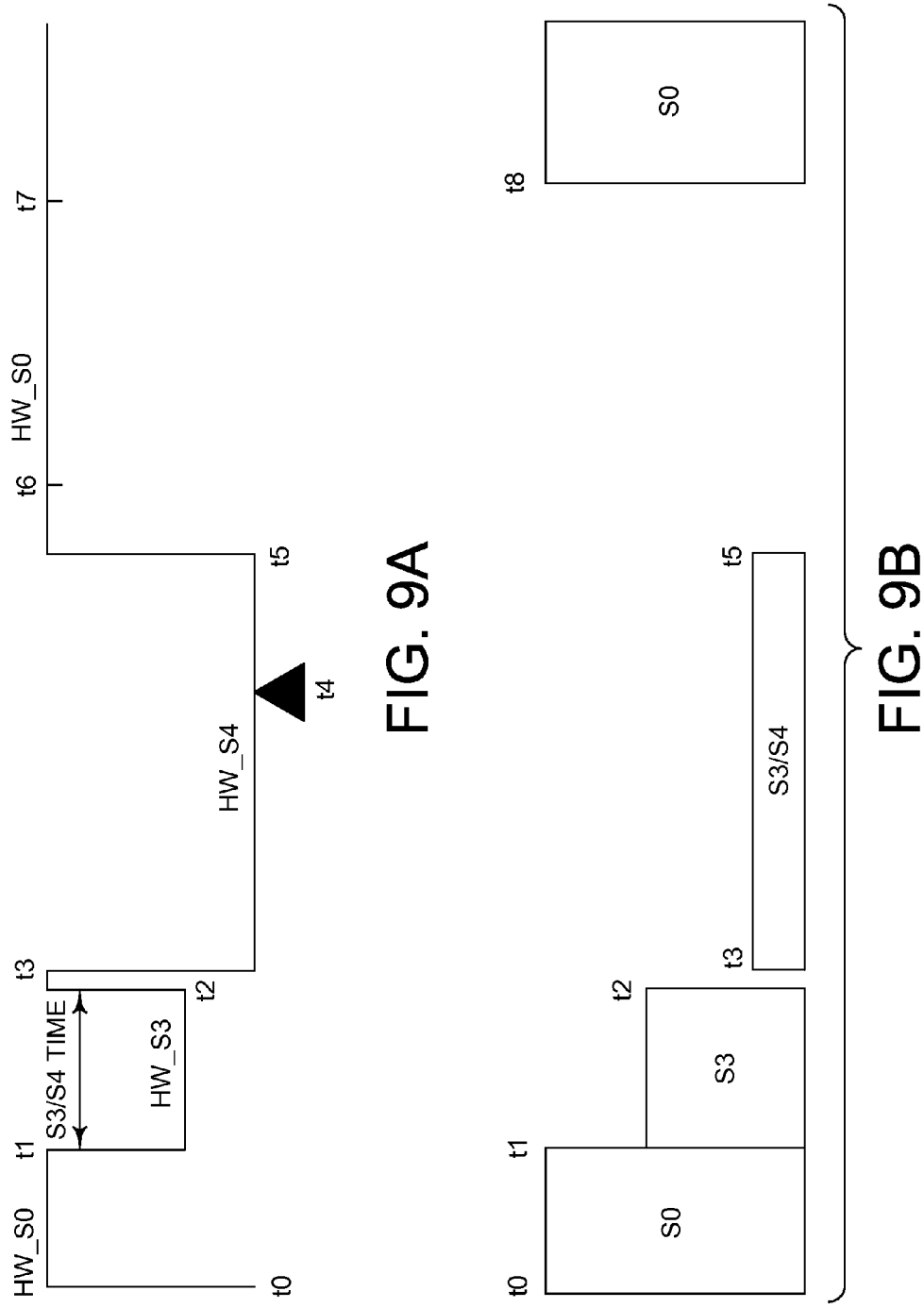

| S34 ENABLE IN BIOS_ROM | ICH | | | REGISTERS 59 AND 61 OF POWER CONTROLLER | BIOS CODE | EXECUTION PATH |
| --- | --- | --- | --- | --- | --- | --- |
| | RTC MEMORY (S34 FLAG) | ACPI REGISTER 57 | REGISTER 58 (TIME UP) | | | |
| 1 | 1 | S3 | — | NO UNAUTHORIZED ACCESS | SIMPLE POST CODE (AUTOMATIC TRANSMISSION OF PASSWORD) | #1 |
| 1 | 1 | S3 | — | UNAUTHORIZED ACCESS DETECTED | BASIC POST CODE + AUTHENTICATION CODE | #2 |
| 1 | 1 | S3 | 1 | NO UNAUTHORIZED ACCESS | SAVE CODE | #3 |
| 1 | 1 | S3 | 1 | UNAUTHORIZED ACCESS DETECTED | SAVE CODE (FORCIBLE SHUTDOWN) | #7 |
| 1 | 0 | S3 | — | NO UNAUTHORIZED ACCESS | S3 POST CODE (AUTOMATIC TRANSMISSION OF PASSWORD) | #4 |
| 0 | 0 | S3 | — | UNAUTHORIZED ACCESS DETECTED | POST SELECTION CODE (FORCIBLE SHUTDOWN) | #5 |
| — | — | S4,S5 | — | — | BASIC POST CODE + AUTHENTICATION CODE | #6 |

FIG. 10

METHOD AND APPARATUS FOR PROTECTING A PASSWORD OF A COMPUTER HAVING A NON-VOLATILE MEMORY

PRIORITY CLAIM

The present application claims benefit of priority under 35 U.S.C. §§120, 365 to the previously filed Japanese Patent Application No. JP2012-005717 with a priority date of Jan. 15, 2012, which is incorporated by reference herein.

BACKGROUND OF THE INVENTION

1. Technical Field

The present invention relates to electronic apparatuses in general, and in particular to a technique for protecting a password of a computer having a non-volatile memory.

2. Description of Related Art

A computer is equipped with disk drives such as a hard disk drive (HDD), a solid state drive (SSD), and the like. The disk drive is connected to a computer main body via a connector and therefore is able to be easily detached. The ATA standard defines the setting of a password for disk drives.

The password is normally set by a user on a setup screen of a basic input output system (BIOS). The set password is stored in a system area on a disk to which the user is not able to access. After the password is set, the user area on the disk which stores user data is inaccessible unless the BIOS transmits the password and an unlock command. Even if the computer is stolen, data is not able to be stolen from the disk drive unless the password is known. Therefore, it is important to set a password on a disk drive to protect data.

The computer transitions between a power-off state or a power saving state and a power-on state. In addition, the power of the disk drive is stopped in the power-off state and in the power saving state. Even if a correct password is input to a locked disk drive to unlock the disk drive once, if the computer shifts to the power saving state or the power-off state and then the power supply of the disk drive stops, the disk drive is reset and locked again, and therefore the password needs to be sent again.

Practically, when returning from the power-off state with a password set in a disk drive, a password input is always requested to protect data. The password input, however, has an aspect of burdening the user and degrading the operability. Therefore, in the present situation, whether the password input is to be requested is determined with consideration for usability when returning from a suspend state or a hibernation state.

In many cases, the BIOS does not request a password input in order to improve usability when returning from the suspend state. In this case, to unlock the disk drive, the BIOS automatically transmits a password stored in a secure area to the disk drive on behalf of the user. In this situation, if an eavesdropping device is attached to an interface circuit of the disk drive, the eavesdropping device is able to eavesdrop the password, which the BIOS transmits to the disk drive at the time of returning from the suspend state.

If the third party detaches the disk drive from the computer and connects the disk drive to an eavesdropping device connected to the same computer, the third party is able to eavesdrop the password sent by the BIOS. If the BIOS is arranged in advance to transmit a hash value of the password input by the user, the password of a plain text is not stolen. If, however, an eavesdropped hash value is transmitted to the disk drive on behalf of the BIOS, the third party is able to access the disk drive.

In order to prevent the above, when detecting that the disk drive has been detached from the main body at the time of resuming from the suspend state, the conventional BIOS stops the automatic transmission of a password and requests the user to input the password, and only in the case where the correct password is input, the conventional BIOS unlocks the disk drive. Additionally, a unified extensible firmware interface (UEFI) firmware which is an alternative to the BIOS is not able to request the user to input a password even in the case of detecting the detachment of the disk drive when returning from the suspend state, due to architecture restrictions. Therefore, the UEFI firmware has canceled the return to the power-on state and then forcibly shifted the computer to the power-off state to prevent password leakage.

There has not been examined so far a problem of password eavesdropping by inserting an eavesdropping device at the time of returning from a hibernation state. The reason comes from the fact that conventionally a password has been requested independently of whether a disk drive is attached/detached when returning from the hibernation state, similarly to when returning from the power-off state. In recent years, various types of BIOSs which cause a computer to return from the power saving state in a short time have been adopted. Some BIOSs among them automatically transmit a password to a disk drive without requesting a password input in the case of returning from the hibernation state or a state similar thereto.

These BIOSs execute a routine simplified more than a normal routine to complete the boot in a short time when returning from the hibernation state or a state similar thereto. In this case, requesting a password input inhibits returning in a short time. Therefore, the simplified routine is configured based on the premise that the BIOS automatically transmits a password to a disk drive on behalf of a user without displaying a prompt for inputting the password. Accordingly, the use of this type of BIOS causes the problem of password eavesdropping.

If the password input is able to be requested only when the detachment of the disk drive is detected in the same manner as for returning from the suspend state also when returning from the hibernation state, a password is conveniently able to be protected while preventing the decrease in usability. The way of requesting a password in the conventional routine for returning from the hibernation state requires much time for return and therefore conflicts with an object to return in a short time by using a simplified routine.

Furthermore, when returning from the suspend state, a code which displays an input prompt for the password is maintained in the main memory and therefore it is possible to request a password input when the detachment of the disk drive is detected. In the hibernation state, however, the code in the main memory disappears and therefore it is impossible to request a password input in a similar fashion.

Moreover, if the computer is forcibly shifted to the power-off state when returning from the hibernation state in such a way that the UEFI firmware does when returning from the suspend state, the computer comes out of hibernation, which inhibits the user to acquire data under editing before the detachment of the disk drive.

For example, if the computer is forcibly shifted to the power-off state in the case where the third party temporarily detaches the disk drive under hibernation and attaches the disk drive to the same computer with an eavesdropping device connected therebetween, a normal user is not able to return the data under editing which has been edited until then to the main memory when the normal user returns the computer to the power-on state.

Consequently, it would be desirable to provide a method for protecting a password when there is an unauthorized access to a non-volatile memory during a shift to a power saving state after data in the main memory has been saved in the nonvolatile memory. Moreover, it would be desirable to provide a method for protecting a password while maintaining data that has already been stored in the main memory before the shift to the power saving state at the time of returning from the power saving state.

SUMMARY OF THE INVENTION

In accordance with a preferred embodiment of the present disclosure, a password is stored in a non-volatile memory of a computer. The computer is then transitioned to a power saving state. In response to a detection of an unauthorized access to the non-volatile memory during the power saving state transition, a password input is requested from a user. The computer returns to a power-on state from the power saving state when there is a success in authentication of the input password.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein:

FIGS. 9A-9B are diagrams illustrating a power state related to an S34 state; and FIG. 10 is a logical value table by which a POST selection code determines a BIOS execution path.

DETAILED DESCRIPTION OF A PREFERRED EMBODIMENT

[Power State]

Figure 1:
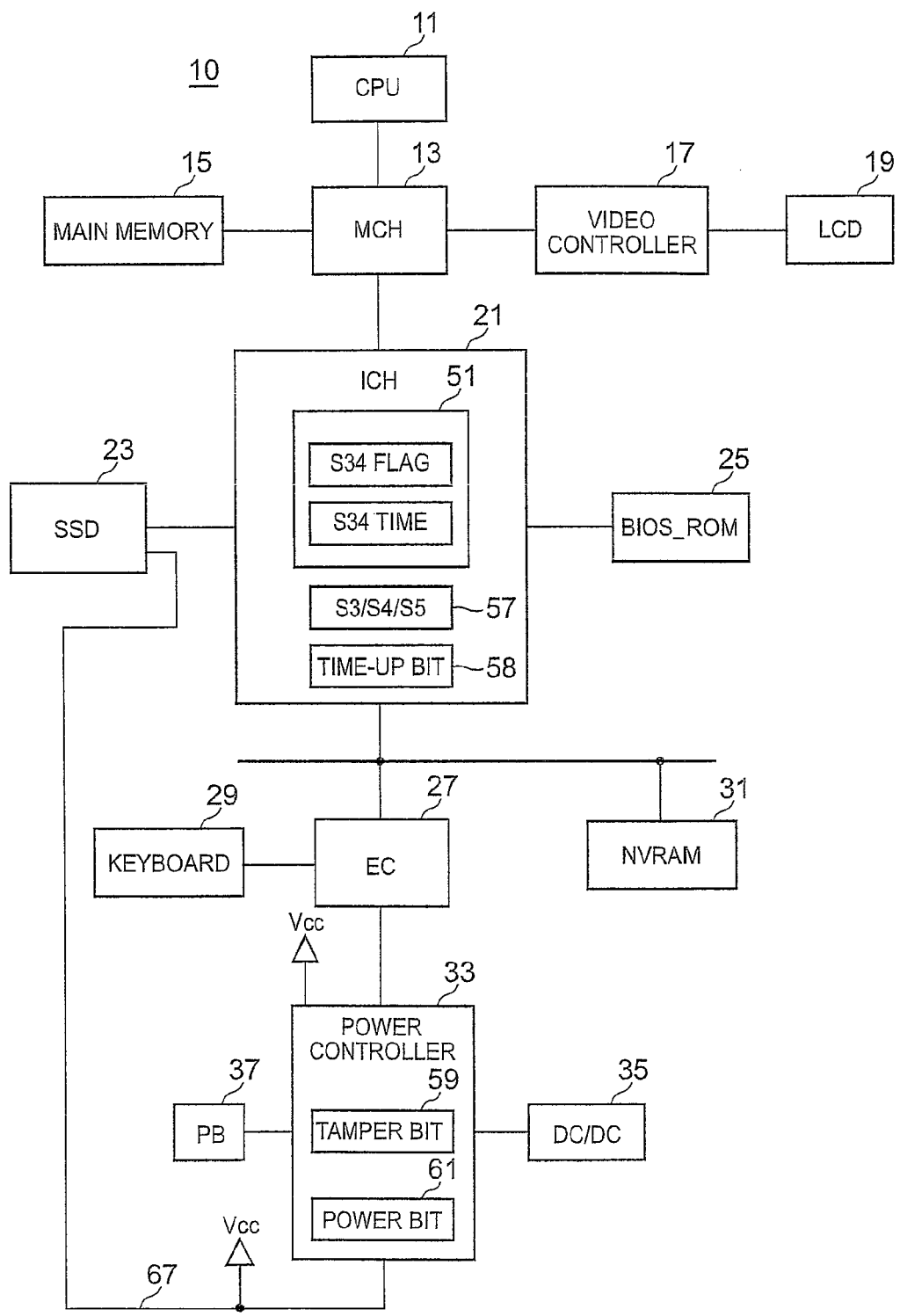
FIG. 1 is a block diagram of a laptop computer, according to a preferred embodiment of the present invention.

FIG. 1 is a functional block diagram illustrating a hardware configuration of a notebook-type personal computer (Laptop PC) 10. Most of the hardware configuration is well-known and therefore the hardware configuration will be described within a range required for the present invention. A memory control hub (MCH) 13 is connected to a CPU 11, a main memory 15, a video controller 17, and an I/O control hub (ICH) 21. The video controller 17 is connected to an LCD 19.

The ICH 21 has interface functions for various standards. In FIG. 1, typically an SSD 23 is connected to a SATA, a BIOS_ROM 25 is connected to an SPI, and an embedded controller (EC) 27 and an NVRAM 31 are connected to an LPC. A keyboard 29 and a power controller 33 are connected to the EC 27. A power button 37 and a DC/DC converter 35 are connected to the power controller 33. The power controller 33 is connected to an SSD 23 via a tamper detection line 67.

The Laptop PC 10 corresponds to a power saving function and a plug-and-play function of an advanced configuration and power interface (ACPI). In the ACPI, there are defined four sleeping states (power saving states) from an S1 state to an S4 state, an S0 state (power-on state), and an S5 state (power-off state). With respect to the sleeping states, the Laptop PC 10 defines only the S3 state and the S4 state.

The S3 state is referred to as so-called "suspend state in which the memory in the main memory 15 is retained and power supplies unnecessary for memory retention of the main memory 15 are stopped. When entering the S3 state, an operating system (OS) saves system contexts, which have been retained in the devices whose power supplies are stopped, to the main memory 15. Thereafter, when the power supplies are turned back on, the system contexts are returned to the devices.

The S4 state is a power state having the longest time before the start-up among the sleeping states supported by the ACPI and is referred to as a hibernation state. In the transition of the Laptop PC 10 from the S0 state to the S4 state, the OS stores the last system contexts of the Laptop PC 10 including the memory contents of the main memory 15 into the SSD 23 and then turns off the power supplies of devices other than the devices which are minimum required for start-up of the power supplies such as the power controller 33.

The S5 state is a power state which is referred to as so-called "soft off." Except that the OS does not save contexts in the SSD 23, the range of the devices supplied with power is basically the same as the S4 state. Hereinafter, the S3 state, the S4 state, and the S5 state are referred to as "Sx state" as a collective term. Relative to the Sx state, the S0 state is a state in which power is supplied to all devices required for the Laptop PC 10 to operate in principle.

In the present invention, it is necessary to consider the Sx state from both sides; the power supply state and the data state. An Sx state to which only the power supply state is applicable is referred to as "hardware-based Sx state" and it is represented by HW_Sx state. In addition, with respect to the S0 state, the state in which power is supplied to all devices is represented by HW_S0 state. The HW_S0 state includes a halfway state from the Sx state to the completion of the transition to the S0 state.

When both the data state in the HW_Sx state or the HW_S0 state and the data state in each power state apply, the state is considered as the Sx state or the S0 state defined by the ACPI. For example, in a transitional condition under the transition from the S4 state to the S0 state, a state where the power supply is returned to the power-on state, but the memory image saved in the SSD 23 is not yet returned to the main memory 15 may be considered as the HW_S0 state, but referred to as neither the S0 state nor the S4 state as a whole.

In the present invention, the S34 state is defined on the basis of a viewpoint that the execution subject on software at the time of transition of the power state is the OS or the BIOS. The S34 state is obtained as a result of the procedure; the OS transitions the power state from the S0 state to the S3 state and thereafter the BIOS automatically transitions the power state from the S3 state to the S4 state. Since the OS performs the shift processing from the S0 state to the Sx state, the power state recognized by the OS coincides with the actual power state in principle. Whereas, in the S34 state, the OS recognizes the transition destination is the S3 state, though the power supply state and the data state substantially correspond to those of the S4 state.

The OS reckons a code for returning from the S3 state to the S0 state into the system contexts at the transition to the S3 state, and therefore the OS is not be able to return the system directly from the S34 state to the S0 state. At the time of returning from the S34 state to the S0 state, the BIOS returns the system from the S34 state to the S3 state once and then the OS which has taken over the control right from the BIOS needs to return the system from the S3 state to the S0 state.

Meanwhile, at a transition to the S4 state, the OS writes the system contexts into the main memory 15 and then the OS saves the data stored in the main memory 15 to the SSD 23. The OS reckons a code for returning from the S4 state to the S0 state, and therefore the OS is able to return the system directly from the S4 state to the S0 state. In some cases, the structure of data saved in the SSD 23 may be slightly different between the S34 state and the S4 state.

The BIOS does not recognize the area (address and data length) of valid data stored in the main memory 15. When the OS transitions the Laptop PC 10 from the S0 state to the S34 state, the BIOS normally copies the contents of the main memory 15 into the SSD 23 in its entirety with the storage areas of addresses at which no data is stored maintained and then transitions the Laptop PC 10 from the S3 state to the S34 state. In comparison thereto, when the OS transitions the system from the S0 state to the S4 state, the OS recognizes the data structure of the main memory 15 and therefore is able to save only the stored valid data area to the SSD 23.

It is assumed that a return from the S4 state or the S5 state to the S0 state is referred to as "boot" and a return from the S3 state to the S0 state is referred to as "resume." The boot and the resume are composed of processing performed by the BIOS and processing performed by the OS. In a transition from the S34 state to the S0 state, it is assumed that a return from the S34 state to the S3 state is referred to as "boot" and a return from the S3 state to the S0 state is referred to as "resume." In a transition from the S0 state to the S34 state, it is assumed that time in which the system resides in the S3 state is referred to as "S34 time."

For a return from the Sx state to the S0 state, a power-on self-test (POST) is performed for a reset device. POST is an operation for causing the code stored in the BIOS_ROM 25 to be able to be used by setting parameters in a chip-set controller and peripheral devices after a reset signal is supplied to the CPU 11 until the OS starts to load. POST may be all processes to be performed by the BIOS code after the CPU 11 is reset until the OS starts to load or may be processes obtained by excluding processes other than initialization for basic devices such as the CPU 11 and the main memory 15 from the all processes.

[Main Hardware]

Returning to FIG. 1, the ICH 21 includes a real time clock (RTC), which is not illustrated, and an RTC memory 51. The RTC and the RTC memory 51 are able to be supplied with power from RTC coin batteries in the case where power from an AC/DC adapter and from a battery pack is stopped and thus the ICH 21 is not supplied with power from the DC/DC converter 35. The RTC memory 51 is a volatile memory for storing setup data of the BIOS, time information generated by the RTC, and the like. The RTC memory 51 stores an S34 flag and S34 time referenced by the BIOS at a transition to the S3 state. The setting of the S34 flag and the S34 time in the RTC memory 51 is performed when a BIOS setup code 119 (See FIG. 2) sets S34 enable in a data area 83 of the BIOS_ROM 25.

The S34 flag is information for use in giving an instruction to the BIOS to perform processing for a transition to the S34 state when the OS has transitioned the Laptop PC 10 to the S3 state or information for the BIOS to detect an unauthorized access to the SSD 23 and then to determine an execution path. The S34 time means a period of time after the OS transitions the system to the S3 state until the BIOS automatically transitions the system to the S34 state. The ICH 21 includes an ACPI register 57 and a register 58 continued to be supplied with power in the S5 state. The ACPI register 57 and the register 58 may be each composed of a nonvolatile memory. The ACPI register 57 corresponds to an SLP_TYP register and an SLP_EN register defined by the ACPI. The ACPI register 57 is set by the OS at the transition from the S0 state to the Sx state. In the register 58, a time-up bit is set by the RTC after a lapse of S34 time since the transition to the S3 state.

The SSD 23 is a large-capacity storage device with a storage area, including an OS, a device driver, an application program, and a flash memory which stores user data and the like. The SSD 23 stores a boot image loaded when the Laptop PC 10 starts up with a boot disk drive. The storage area is separated into a system area and a user area.

The system area is an area in which firmware of the SSD 23 is stored and an access for data writing or reading by a user is inhibited. Upon the transmission of an SSD password and a lock command from the BIOS to the SSD 23, the firmware sets the SSD password and stores the set SSD password into the system area.

Upon the transmission of the SSD password and an unlock command from the BIOS to the SSD 23 in which the SSD password is set, the firmware authenticates the password and unlocks the disk drive to permit an access from the system to the user area. In the user area, a save area is defined for saving a program and data, which have been loaded in the main memory 15, at the transition to the S4 state or the S34 state, in addition to the area for storing user data and a program.

The EC 27 is a microcomputer composed of a CPU, a ROM, a RAM, and the like, further including an A/D input terminal with a plurality of channels, a D/A output terminal, a timer, and a digital I/O terminal. The EC 27 is able to execute a program related to the management of the internal operating environment of the Laptop PC 10 independently of the CPU 11. The EC 27 includes a keyboard controller.

The power controller 33 is a wired-logic digital control circuit (ASIC) which controls the DC/DC converter 35 on the basis of an instruction from the EC 27. The DC/DC converter 35 converts a DC voltage supplied from an AC/DC adapter or a battery pack, which is not illustrated, to a plurality of voltages required to operate the Laptop PC 10 and supplies each device with power on the basis of a power supply class defined according to the power state. After the generation of a start event by pressing the power button 37, the power controller 33 supplies all devices of the Laptop PC 10 with power and transitions the system to the HW_S0 state.

The power controller 33 is connected to the SSD 23 via a tamper detection line 67. The tamper detection line 67 is pulled up by the same power supply as the power controller 33. While being attached to the Laptop PC 10, the SSD 23 maintains the electric potential of the tamper detection line 67 at a ground level. If the SSD 23 is detached from the Laptop PC 10, the electric potential of the tamper detection line 67 rises. The power controller 33 has a register 59 in which a tamper bit is set and a register 61 in which a power bit is set.

The logic circuit of the power controller 33 sets the register 59 to logical value 1 upon detecting a leading edge at a rise of the electric potential of the tamper detection line 67. The BIOS sets the register 61 to logical value 1 when the password is successfully authenticated. The registers 59 and 61 are released when the power supply of the power controller 33 stops and then set to logical value 0.

The power button 37 is an illustration of a device which generates a start event. Devices generating other start events are a lid sensor, a fingerprint recognition device, a network card which receives a WOL magic packet, and the like.

[Configuration of BIOS_ROM]

Figure 2:
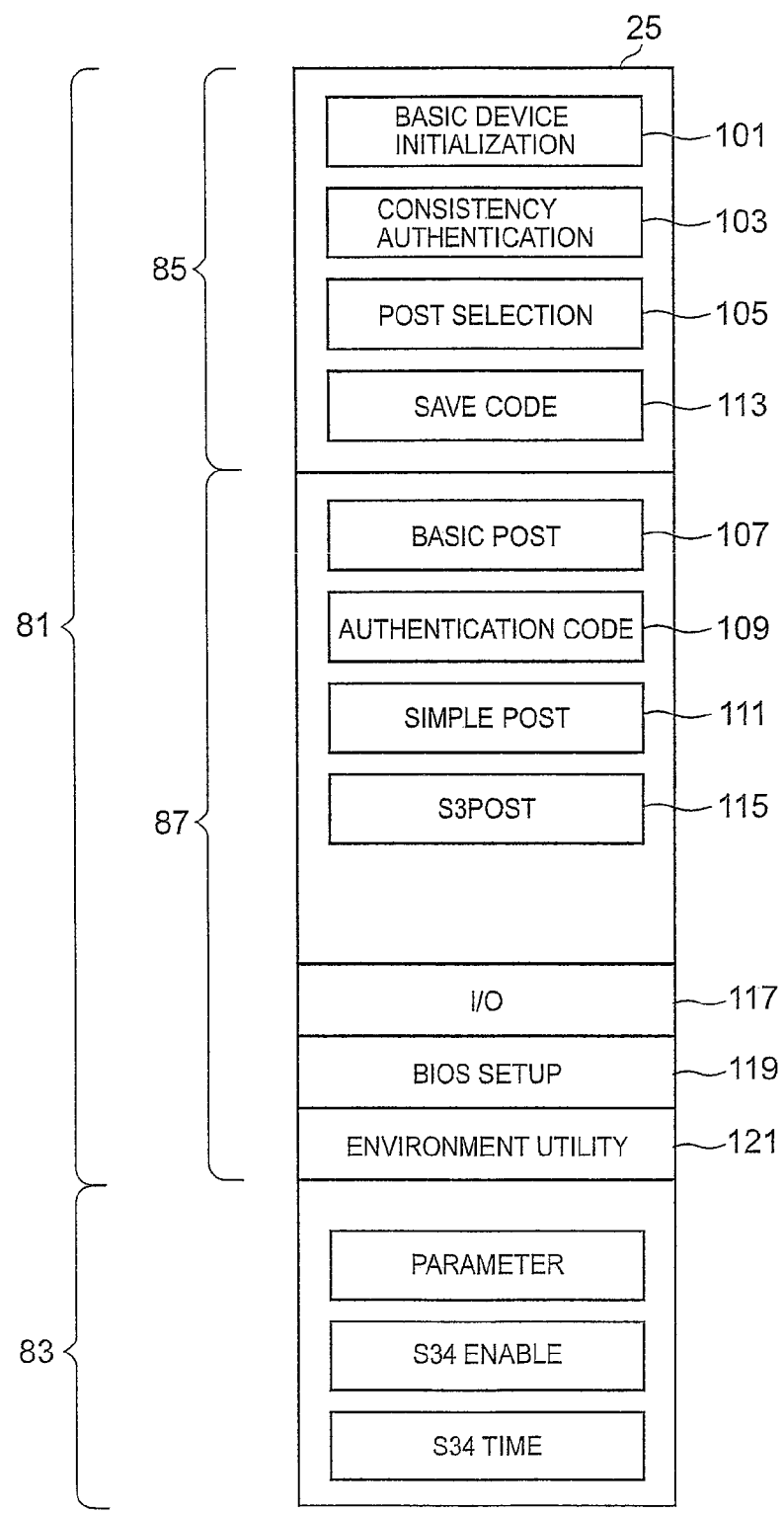
FIG. 2 is a diagram illustrating a data structure of a BIOS_ROM.

FIG. 2 is a diagram illustrating a data structure of the BIOS_ROM 25. The BIOS code stored in the BIOS_ROM 25 is composed of UEFI firmware. The BIOS_ROM 25 includes a BIOS area 81 which stores the BIOS code and a data area 83 which is used by the BIOS code. The BIOS_ROM 25 uses a boot block method in order to reduce risk involved with rewriting of the BIOS code. The BIOS area 81 is separated into a boot block 85 and a system block 87. The boot block 85 is a write-protected storage area and a program or a code stored in the boot block 85 are treated as a core root of trust for measurement (CRTM) specified in the specification of trusted platform module (TPM). Thus, it is inhibited to rewrite the program or code stored in the storage area without a special authority.

The boot block 85 stores a basic device initialization code 101, a consistency authentication code 103, a POST selection code 105, and a save code 113 as CRTM. The CRTM is configured as a consistent part in the BIOS code and is always executed at the beginning when the Laptop PC 10 is booted. All consistency measurements related to the platform of the Laptop PC 10 are performed by the consistency authentication code 103. The basic device initialization code 101 performs the detection, examination, and initialization of the CPU 11, the main memory 15, and other basic devices required for the processing from loading the BIOS code into the main memory 15 to starting the execution within the minimum range when the Laptop PC 10 starts up and returns from the Sx state to the S0 state.

The POST selection code 105 controls the execution path of the BIOS code by determining which of the basic POST code 107, the simple POST code 111, and the S3 POST code 115 is to be executed with reference to the registers 57 and 58 of the ICH 21, the S34 flag in the RTC memory 51, the registers 59 and 61 of the power controller 33, or by detecting an occurrence of an unauthorized access to the SSD 23. The save code 113 transfers the state of the main memory 15 in the S3 state to the SSD 23 at the transition from the S0 state to the S34 state. The save code 113 does not recognize the data structure of the storage area of the main memory 15 unlike the OS and therefore, as a rule, copies the memory state of the entire addresses of the main memory 15 from the start address to the end address of the storage area to the SSD 23 in its entirety.

The basic POST code 107 performs complete POST processing such as detection, examination, and initialization for all internal devices in order to boot from the S4 state or the S5 state. The basic POST code 107 outputs an error by a beep sound or a screen display when determining that a predetermined device cannot be detected or that the device does not normally operate as a result of examination. The basic POST code 107 acquires parameters from peripheral devices connected to the MCH 13 or the ICH 21, selects an optimal parameter in the current system, and sets the optimal parameter to the controllers included in the MCH 13 and the ICH 21.

It is assumed that the processing of examining the internal devices and setting the optimal parameter selected based on the information acquired by the examination to the controllers as described above is referred to as "initialization" and that the processing of setting parameters, which were set in the past and have been stored in some locations, to the corresponding controllers is referred to as "restore." In the restore processing, processing for the detection and examination of the internal devices and the selection of the optimal parameter is omitted and therefore the operation is able to be completed in a shorter time than the initialization.

An authentication code 109 displays a prompt for setting a BIOS password such as a power-on password, an SSD password, or an administrator password on the LCD 19 and unlocks the disk drive by authenticating the input password or transmitting the input password to the SSD 23. In a situation where any BIOS password is set, the authentication code 109 is always executed in the middle or the end of execution of the basic POST code 107. If no BIOS password is set, the authentication code 109 is not executed even after a shift of the control right. The authentication code 109 is able to hash the password input by the user and then to transmit the hashed password to the system or the SSD 23.

When returning to the S0 state from the S4 state or the S5 state, the simple POST code 111 omits the POST processing such as the detection of some devices, the examination thereof, and the selection of an optimal parameter to complete the boot in a shorter time than the basic POST code 107. As devices for which the POST processing is omitted, it is possible to select devices which spend much time for initialization due to long response time, such as an SSD 23, a USB device, and a wireless module, and devices which do not cause any problem even after the OS initializes the devices from the viewpoint of the operation timing.

The simple POST code 111 is able to be configured to reduce POST time by previously storing the optimal parameter, which has been set by the basic POST code 107 executed at boot from the S4 state or the S5 state, and information on the devices at that time (hereinafter, referred to as parameters) into the data area 83 of the BIOS_ROM 25 or the NVRAM 31 and restoring the previously-stored parameters with the exception of the basic devices at the time of boot.

The simple POST code 111 is configured to reduce the return time and therefore does not request the user to input an SSD password in a situation where the SSD password is set. The simple POST code 111 transmits a hash value of the SSD password which has been input by the user to the SSD 23, in which the SSD password is set, in order to unlock the disk drive on behalf of the user.

The S3 POST code 115 completes the POST processing in a shorter time than the simple POST code 111 at resume from the S3 state. At boot from the S4 state or the S5 state, the parameters set by the basic POST code 107 are stored in the main memory 15 in the S0 state. In suspension from the S0 state to the S3 state, the parameters stored in the main memory 15 and the memory of the S3 POST code 115 are maintained. The S3 POST code 115 is able to complete the setting of the controller in a short time by restoring the parameters stored in the main memory 15. The S3 POST code 115 automatically transmits the hash value of the SSD password input by the user to the SSD 23 to unlock the disk drive, on behalf of the user at a transition from the S3 state to the S0 state in a situation where the SSD password is set.

An I/O code 117 provides an I/O interface for accessing a peripheral device when the CPU 11 operates in a real mode. The BIOS setup code 119 provides an interface for a user to customize the settings for internal devices such as the selection of a boot drive, enable/disable of functions of the devices, and enable/disable of security. With a manipulation of a predetermined key before the OS is loaded at boot, the BIOS setup code 119 is executed and then the LCD 19 displays a BIOS setup screen.

Most of setup data which has been set by the user is stored in the RTC memory 51 in the ICH 21. The CPU 11 references the setup data stored in the RTC memory 51 when executing the basic POST code 107, the simple POST code 111, or the S3 POST code 115. The user is able to set the use of the S34 state to enable/disable through the BIOS setup screen. Furthermore, when setting the use of the S34 state to enable, it is also possible to set the S34 time. The S34 enable flag and the S34 time, which have been set, are stored in the data area 83. When the S34 state is set to enable, the BIOS setup code 119 also sets the S34 flag and the S34 time in the RTC memory 51. An environment utility code 121 controls the temperature and power of the Laptop PC 10. Each BIOS code does not need to be composed of an independent code as illustrated in FIG. 2, but some of the codes may be used in common and the execution path may be controlled so that the respective functions are implemented. The present invention is also applicable to a BIOS_ROM which does not use the boot block method or to a BIOS_ROM in which the entire BIOS area is a boot block.

[Data Structure of Main Memory]

Figure 3:
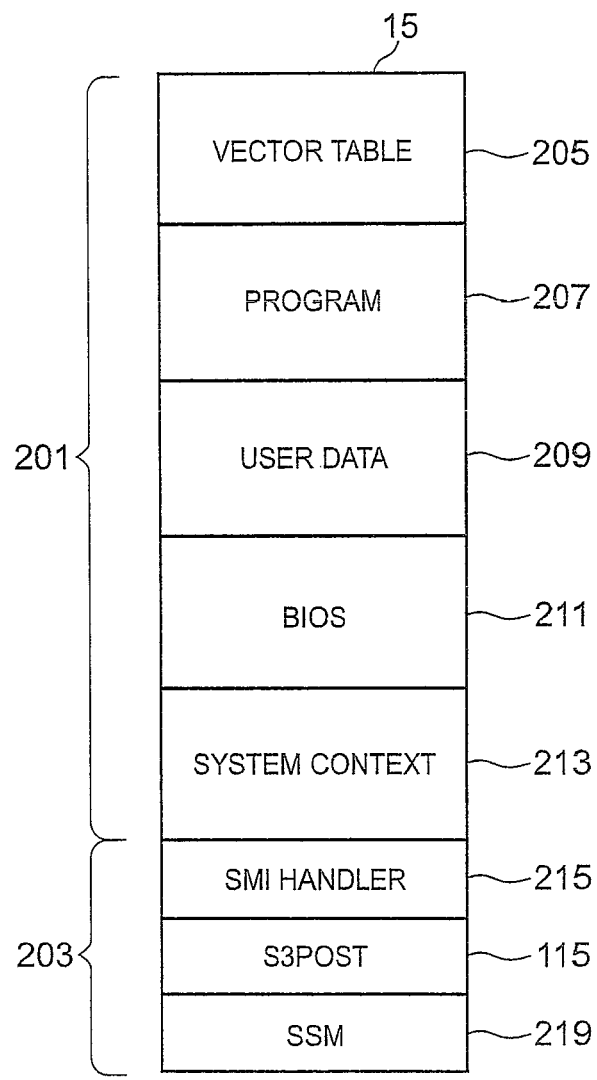
FIG. 3 is a diagram describing a data structure of a main memory in an S0 state.

FIG. 3 is a diagram for describing a data structure of the main memory 15 in the S0 state. In the main memory 15, a general area 201 and an SMRAM area 203 are defined. The general area 201 stores a vector table 205, an OS, a device driver, a program 207 such as an application, and user data 209 under editing. The vector table 205 stores 256 vector addresses each of which is made up of four bytes of a segment address and an offset address. In the case of an occurrence of an interrupt in the CPU 11, the vector table 205 stores the address of a program which processes the interrupt.

The general area 201 further stores a BIOS code 211 other than the code stored in the boot block 85, which is to be executed in a cache of the CPU 11 at reset, and a system context 213. The system context 213 includes hardware contexts set in the registers of the devices by the OS or the device driver and software contexts such as control data stored in the cache of the CPU 11 or the caches of other devices by the OS or the device driver.

The OS writes the system context 213 into the main memory 15 at a transition from the S0 state to the S3 state or to the S4 state and returns the system context 213 to the previous device to return the system to the S0 state at a return from the S3 state to the S0 state. The system context 213 includes a vector of a code to be processed by the OS at a transition from the S3 state or the S4 state.

An SMI handler 215 and an S3 POST code 115 are loaded into the SMRAM area 203, and further an area called a state save map (SSM) 219 is allocated therein. The S3 POST code 115 is called and executed by the SMI handler 215 at a transition from the S3 state to the S0 state. The basic POST code 107, the authentication code 109, and the simple POST code 111 included in the BIOS code 211 in the main memory 15 are executed at a transition from the S4 state or the S5 state to the S0 state.

Furthermore, the authentication code 109 is executed when the control is temporarily transferred to the basic POST code due to a detection of an unauthorized access to the SSD 23 at a return from the S34 state. The codes in the SMRAM area 203 are repeatedly executed at a transition between the S0 state and the S3 state and thus are maintained until a transition to the S4 state or the S5 state. The BIOS code 211, however, does not need to be used after a return to the S0 state and therefore the area of the main memory 15 for storing the BIOS code 211 is set in such a way that other data can be rewritten on the area.

[Procedure for Password Protection]

Figure 4:
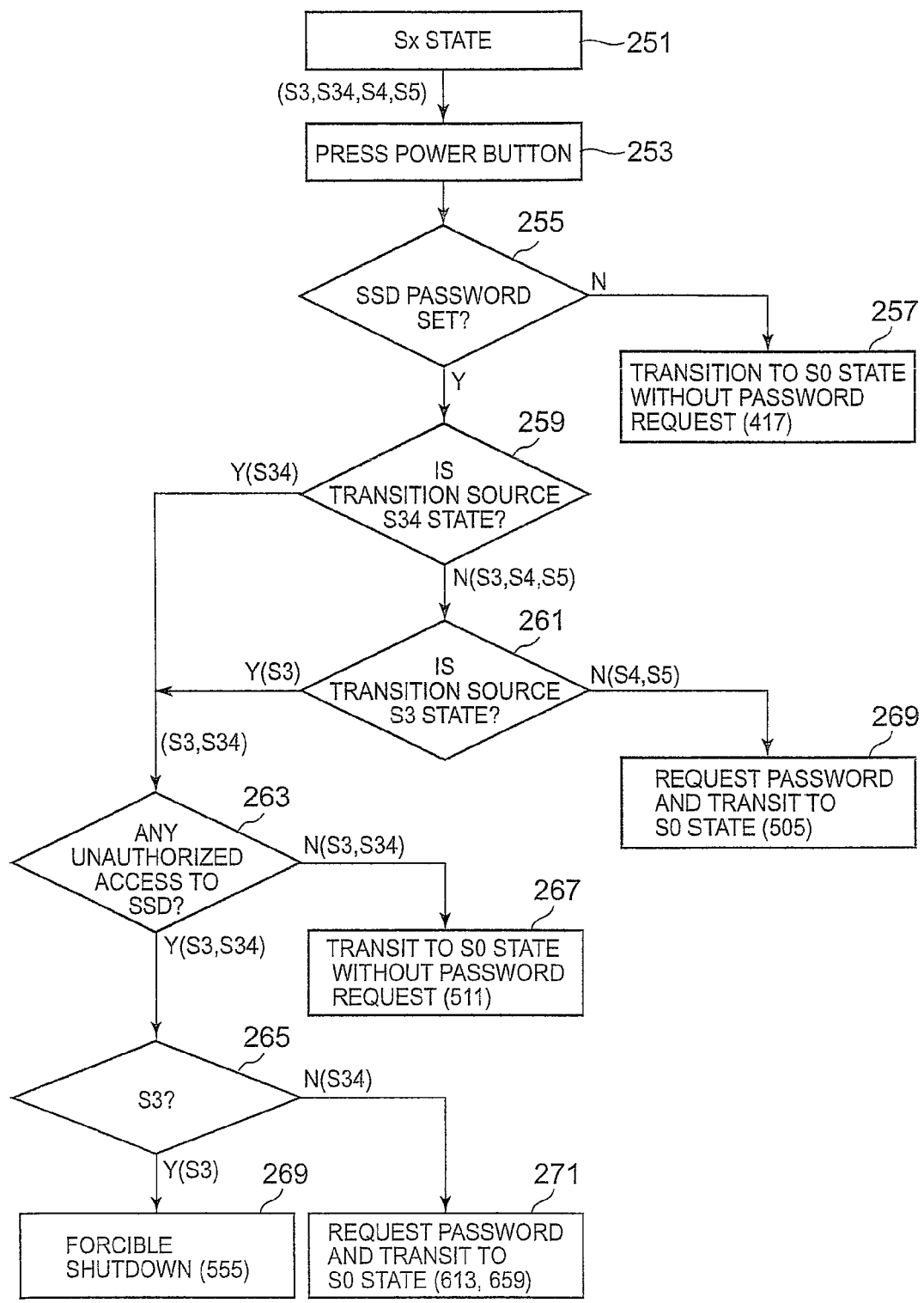
FIG. 4 is a flowchart illustrating the entire procedure for password protection.

Subsequently, the procedure for password protection implemented by the Laptop PC 10 is described with reference to FIG. 4 to FIG. 10. FIG. 4 is a master flowchart illustrating the entire procedure for password protection, and FIG. 5 to FIG. 8 are flowcharts each illustrating a detailed procedure for password protection. FIG. 9A is a diagram illustrating a hardware-based power state related to the S34 state in FIG. 4 to FIG. 8, and FIG. 9B is a diagram illustrating an ACPI power state including a data state corresponding to the hardware-based power state. FIG. 10 is a logical value table for determining an execution path of the BIOS code by the POST selection code 105. In FIG. 10, if the register 61 is set to logical value 0, it is determined that an unauthorized access has been made independently of the value of the register 59. If the register 61 is set to logical value 1, it is determined that no unauthorized access has been made in the case where the register 59 is set to logical value 0 and determined that an unauthorized access has been made in the case where the register 59 is set to logical value 1.

In block 251 of FIG. 4, the Laptop PC 10 transitions to the Sx state and the power button 37 is pressed in block 253. In block 255, the BIOS determines whether an SSD password is set for the SSD 23. Unless the SSD password is set, the BIOS returns the system to the S0 state without requesting the user to input a password in any Sx state of the transition source in block 257 (block 417 of FIG. 6).

If the SSD password is set, the BIOS determines whether the transition source is in the S34 state in block 259. If the BIOS determines that the transition source is in the S34 state, the control shifts to block 263. If the BIOS determines that the transition source is in any of other states, the S3, S4, or S5 state, the control shifts to block 261. In block 261, if the BIOS determines that the transition source is in the S3 state, the control shifts to block 263. If the BIOS determines that the transition source is in any of other states, that is, the S4 or S5 state, the control shifts to block 269.

Figure 7:
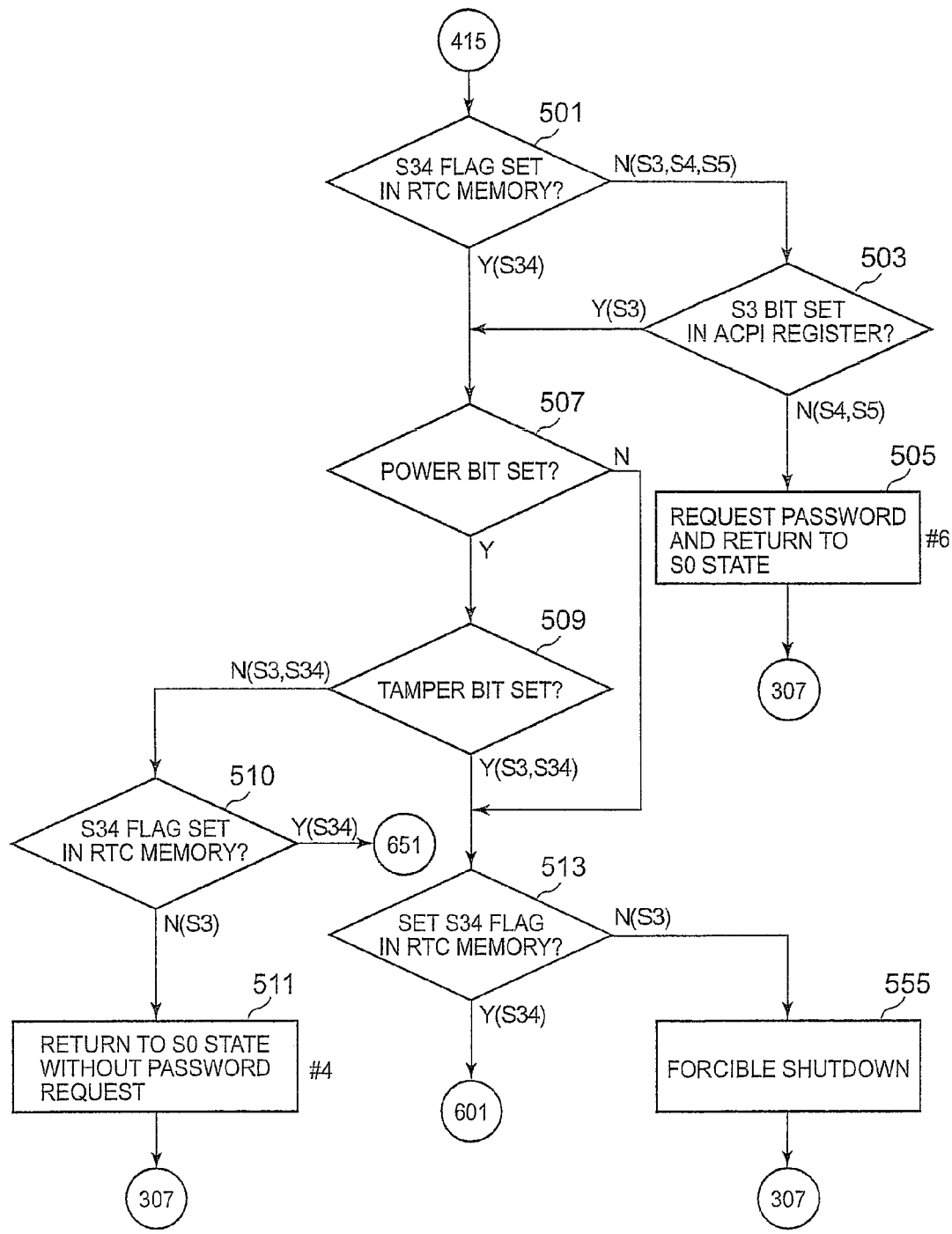

In block 269, the BIOS requests the user to input a password and transitions the system to the S0 state (block 505 of FIG. 7). In block 263, if the BIOS detects an unauthorized access to the SSD 23, the control shifts to block 265. Unless the BIOS detects any unauthorized access to the SSD 23, the control shifts to block 267. In block 265, the BIOS determines whether the transition source is in the S3 state or the S34 state. If the BIOS determines that the transition source is in the S3 state, the control shifts to block 269. If the BIOS determines that the transition source is in the S34 state, the control shifts to block 271. In block 269, the BIOS forcibly shuts downs the system (block 555 of FIG. 7). In block 271, the BIOS requests the user to input a password and returns the system to the S0 state (blocks 613 and 659 of FIG. 8). In block 267, the BIOS transitions the system to the S0 state without requesting the user to input a password (block 511 of FIG. 7, block 659 of FIG. 8).

According to blocks 267 and 271, at the time of returning from the S34 state, the password input is requested only in the case of detection of an unauthorized access to the SSD 23. In addition, at the time of returning from the S34 state, the BIOS is able to complete the boot processing in a short time without requesting a password input unless an unauthorized access to the SSD 23 is detected. Moreover, in the case of detection of an unauthorized access, the BIOS does not automatically transmit a password to the SSD 23 without a password input from the user or does not force the transition to the S5 state. This enables a password protection and return of data saved in the SSD 23.

Figure 5:
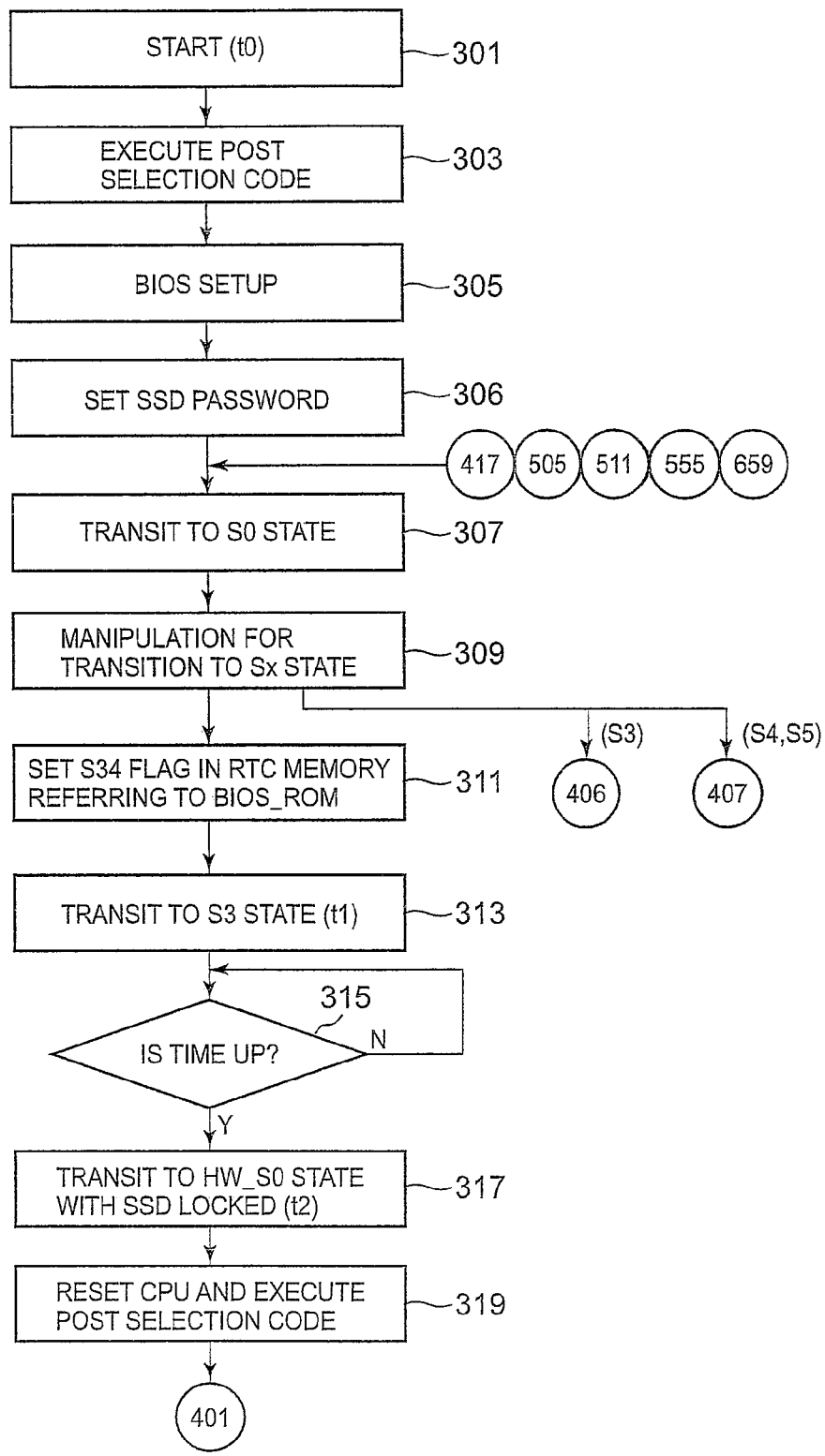
FIGS. 5-8 are flowcharts illustrating a detailed method for password protection.

In block 301 of FIG. 5, the Laptop PC 10 first transitions to the S5 state and the ACPI register 57 is set in the S5 state. In addition, the registers 58 and 59 and the S34 flag in the RTC memory 51 are cleared and indicate logical value 0. A power bit is set in the register 61, which indicates logical value 1. If a start event is generated by manipulating the power button 37 and the power supply of the Laptop PC 10 is started, the power controller 33 activates the DC/DC converter 35 to transition the Laptop PC 10 to the HW_S0 state. The ICH 21 which has received the start event from the EC 27 transmits a reset signal to the CPU 11 for power-on reset. The reset CPU 11 is configured to start the execution from the basic device initialization code 101 stored in the boot block 85.

The CPU 11 which has received the reset signal at block 303 initializes an internal cache and registers after the voltage is stable. Thereafter, the CPU 11 accesses an address (reset vector) of the previously-determined BIOS_ROM 25 and fetches an instruction. The MCH13 changes the reset vector, which is an access destination of the CPU 11, to an address of the basic device initialization code 101 of the BIOS_ROM 25.

The CPU 11 reads the BIOS codes stored in the boot block 85 out to the cache and performs the detection, examination, and initialization of the basic devices required for executing the BIOS codes such as the main memory 15 and the MCH 13. The basic device initialization code 101 writes the parameters, which have been set in the controller for initialization, into the data area 83 and, if necessary, into other non-volatile memories. Subsequently, after the main memory 15 is prepared to be used, the basic device initialization code 101 loads the BIOS codes stored in the system block 87 and the parameters in the data area 83 into the main memory 15 so as to enable the main memory 15 to be used as a shadow RAM. Upon the completion of the execution of the consistency authentication code 103 and the POST selection code 105 stored in the boot block 85 described below, the CPU 11 accesses the main memory 15 and executes the loaded BIOS codes.

Subsequently, the consistency authentication code 103 performs verification of the alteration of the BIOS codes stored in the system block 87. Upon the completion of the verification, the CPU 11 executes the POST selection code 105. The POST selection code 105 first references the S34 flag in the RTC memory 51. After checking that the S34 flag is not set, the POST selection code 105 references the ACPI register 57. The POST selection code 105 contains a logical value table in FIG. 10. After checking that the S5 bit is not set in the ACPI register 57, the POST selection code 105 transfers the control to the basic POST code 107 according to the execution path #6 in FIG. 10. In the following procedure, the POST selection code 105 is executed in the same procedure with reference to the logical value table in FIG. 10 every time the CPU 11 is reset.

In this specification, the BIOS password is not set and therefore the password input is not requested even after the control is transferred to the authentication code 109. In block 305, immediately after the user presses a predetermined function key on the keyboard 29 in an early stage in which the basic POST code 107 is executed, the BIOS setup code 119 is invoked and the LCD 19 displays a setup screen.

In connection with the present invention, the user performs the setting of an SSD password, the setting of the S34 flag for the data area 83 of the BIOS_ROM 25, and the setting of the S34 time. The user is able to set the S34 time within the range of 0 hour to predetermined hours with consideration for the importance of the convenience and power saving of the S3 state. The BIOS setup code 119 hashes and stores the input SSD password into a secure non-volatile memory and then stores other setup data into the RTC memory 51. The BIOS setup code 119 transmits a hash value of the SSD password to the SSD 23 along with a password setting command.

In block 306, the firmware of the SSD 23 processes the received password setting command and sets an SSD password. The set SSD password is validated every time the SSD 23 is reset after this. After the user terminates the BIOS setup code 119, the basic POST code 107 which has been halted is executed. The basic POST code 107 performs the detection, examination, and initialization of all remaining devices which have not been processed yet by the basic device initialization code 101.

The basic POST code 107 writes the parameters set in the controller and the peripheral devices for initialization into the data area 83 and, if necessary, other non-volatile memories. Upon completion of the BIOS boot processing, the control transfers to the OS boot processing in block 307. The OS, the device driver, and programs such as applications are loaded into the main memory 15 for execution. Thereafter, the OS opens the storage area of the main memory 15 in which the BIOS code 211 is loaded for general programs, except codes required for resume from the S3 state to the S0 state, and then allows a transition to the S0 state.

In block 309, the user carries out manipulation for transitioning the Laptop PC 10 from the S0 state to the Sx state by a press of the power button 37, manipulation through an OS interface, or execution of power management. When the manipulation for transition to the S34 state is performed, the control shifts to block 311. When the manipulation for transition to the S3 state is performed, the control shifts to block 406 of FIG. 6. When the manipulation for transition to the S4 or S5 state is performed, the control shifts to block 407 of FIG. 6. While the manipulation for transition to the S3 state is the same as the user manipulation for transition to the S34 state or the power management operation, the BIOS code determines which is performed by determining whether the S34 state set in the BIOS_ROM 25 is enabled or disabled. If the ICH 21 which detected the manipulation event in block 311 interrupts the CPU 11, the OS gives an instruction to the running program to perform processing for transition to the S3 state and stores the system context 213, which disappears in the S3 state, into the main memory 15.

The OS, and if necessary, the device driver and the BIOS save the system context to the main memory 15. Upon receiving a notice of the completion of preparing for transition to the S3 state from each program, the OS makes setting in the ACPI register 57 so that the transition to the S3 state is enabled. The SMI handler 215 traps the setting to the ACPI register 57 and checks that the S34 flag is set in the BIOS_ROM 25. Thereupon, the SMI handler 215 sets the S34 flag and the S34 time in the RTC memory 51. After the ACPI register 57 is set to enable, the ICH 21 gives an instruction to the EC 27 to stop the power supplies other than power supplies required for retaining the memory of the main memory 15 and operates an RTC alarm mechanism (RTC Resume). In block 313, the Laptop PC 10 transitions to the S3 state (time t1).

In block 315, when the time measured by the RTC reaches the S34 time set in the RTC memory 51, the control shifts to block 317. In block 317, the RTC sets a time-out bit in the register 58 and gives an instruction to the EC 27 to transition the Laptop PC 10 to the HW_S0 state (time t2). If the power supply of the SSD 23 is turned on, the registers are initialized and reset. The SSD 23, which has been in an unlocked state until then, is locked by the reset. Thereafter, the SSD 23 denies an access to the user area made by the system unless the SSD 23 receives the unlock command and an SSD password input by the user or an SSD password managed for automatic transmission by the POST selection code 105, the simple POST code 111, or the S3 POST code.

In block 319, the CPU 11 is reset and executes the POST selection code 105. Thereafter, the control shifts to block 401 of FIG. 6. In block 401, the POST selection code 105 clears the time-up bit of the register 58 by selecting an execution path #3 in FIG. 10 in the case of not detecting an unauthorized access to the SSD 23 with reference to the registers 58, 59, and 61 and the RTC memory 51 or by selecting an execution path #7 in the case of detecting an unauthorized access to the SSD 23. In this procedure, it is assumed that no unauthorized access is detected at this time point, and therefore the POST selection code 105 selects the execution path #3. If the POST selection code 105 selects the execution path #7, the system is forcibly shut down. Since the SSD 23 has already been locked in block 317, the POST selection code 105 automatically transmits the SSD password under management to unlock the SSD 23 and thereafter passes the control right to the save code 113. In block 403, the save code 113 transfers the memory state of the main memory 15 to the SSD 23. In block 405, the save code 113 stops the power supplies other than the power supply of the power controller 33 required for start-up through the EC 27 and transitions the Laptop PC 10 to the HW_S4 state. As a result, the OS recognizes that the system is transitioned to the S3 state, but the power supply state and the data state of the Laptop PC 10 transition to the S34 state which is the S4 state (time t3).

In block 406, the POST selection code 105 checks that the S34 state set in the BIOS_ROM 25 is disabled and omits the setting of the S34 flag in the RTC memory 51. If the OS makes settings in the ACPI register 57 so that the transition to the S3 state is enabled, the ICH 21 gives an instruction to the EC 27 to transition the system to the HW_S3 state. In block 407, if the OS makes settings in the ACPI register 57 so that the transition to the S4 state or to the S5 state is enabled, the ICH 21 gives an instruction to the EC 27 to transition the system to the HW_S4 state or to the HW_S5 state.

In block 409, if the SSD 23 is detached from the Laptop PC 10 in the Sx state and reattached, the electric potential of the tamper detection line 67 rises once and then reaches zero (time t4). The logic circuit of the power controller 33 detects the leading edge of the electric potential of the tamper detection line 67 and sets the tamper bit of the register 59 to logical value 1. If the power supply of the power controller 33 stops in the Sx state, the tamper bit in the register 59 is cleared and set to logical value 0 and at the same time the power bit of the register 61 is also cleared and set to logical value 0. This state also occurs in the case of an insertion of an eavesdropping device between the SSD 23 and the ICH 21 and therefore it is assumed that an unauthorized access to the SSD 23 has occurred.

In block 411, if the power button 37 is pressed at an arbitrary time, a start event is generated and the power controller 33 operates the DC/DC converter 35 to transition the system to the HW_S0 state. In block 413, the CPU 11 executes the POST selection code 105 (time t5). In block 415, the POST selection code 105 determines whether the SSD password is set in the SSD 23.

If the SSD password is set in block 306 of FIG. 5, the control shifts to block 501 of FIG. 7. Unless the SSD password is set, the control shifts to block 417. In block 417, the system returns to the S0 state without requesting the user to input a password in any power state of the transition source and then returns to block 307 of FIG. 5.

In block 501, the POST selection code 105 checks whether the S34 flag is set in the RTC memory 51. If the S34 flag is set, the power state of the transition source is in the S34 state and therefore the control shifts to block 507. Unless the S34 flag is set, the control shifts to block 503 and the POST selection code 105 further checks whether the S3 bit is set in the ACPI register 57. If the S3 bit is set, the power state of the transition source is the S3 state and therefore the control shifts to block 507.

Unless the S3 bit is set, the SSD password is set and the power state of the transition source is the S4 state or the S5 state, and therefore the control shifts to block 505. In block 505, the POST selection code 105 selects an execution path #6 in FIG. 10 with reference to the ACPI register 57 and the S34 flag in the RTC memory 51, executes the basic POST code 107 and the authentication code 109, requests the user to input a password, and then returns the system to the S0 state.

In block 507, the POST selection code 105 checks the power bit with reference to the register 61. If the power bit is set, the control shifts to block 509. If the power bit is cleared, the control shifts to block 513. In block 509, the POST selection code 105 checks the tamper bit with reference to the register 59. If the tamper bit is set, it means that an unauthorized access to the SSD 23 is detected and therefore the control shifts to block 513. Unless the tamper bit is set, no unauthorized access to the SSD 23 is detected and therefore the control shifts to block 510. In block 510, the POST selection code 105 determines whether the S34 flag is set with reference to the RTC memory 51.

Figure 8:
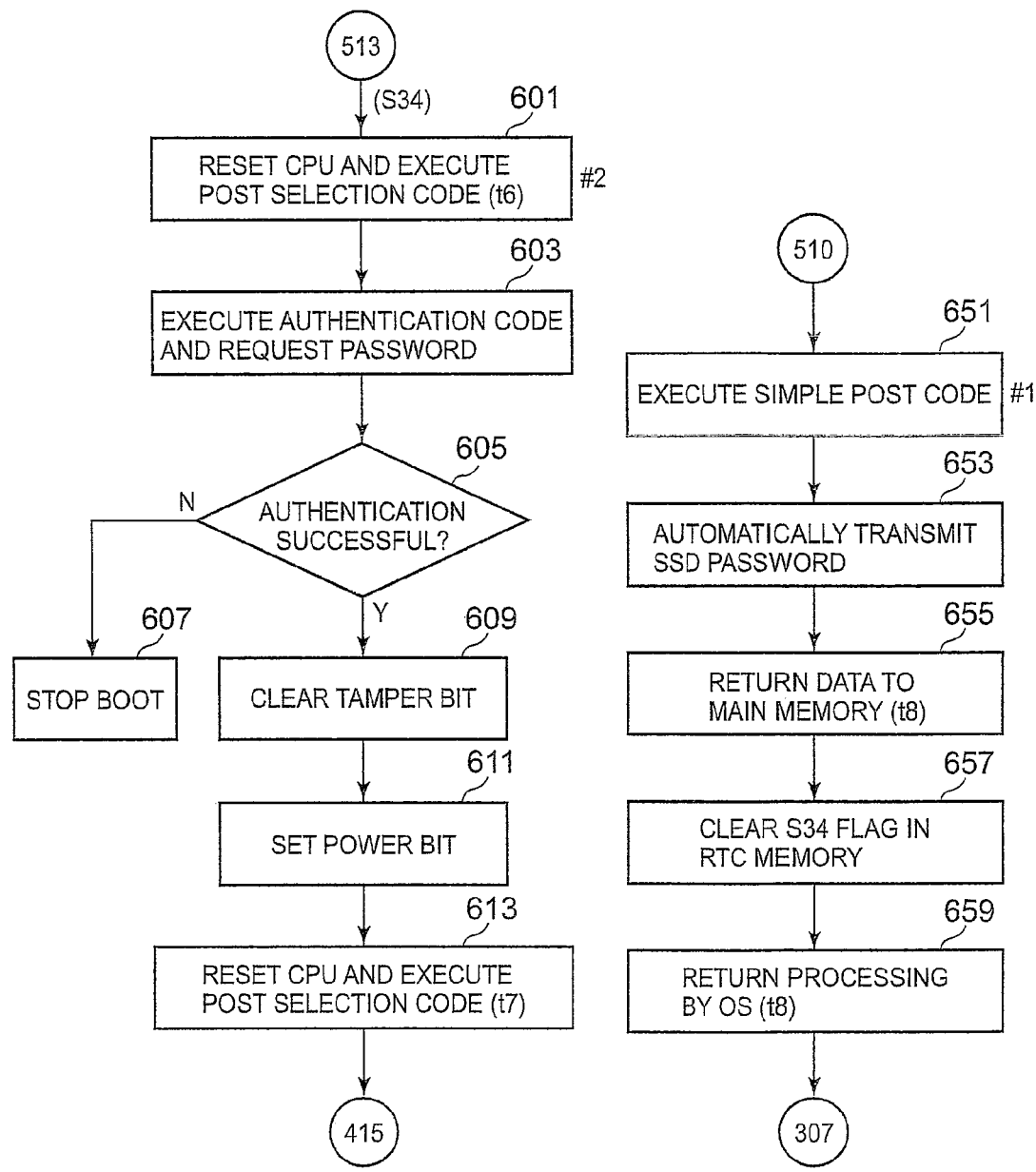

If the S34 flag is set, the POST selection code 105 selects an execution path #1 in FIG. 10 and the control shifts to block 651 of FIG. 8. Unless the S34 flag is set, it means the transition from the S3 state and therefore the control shifts to block 511. In block 511, the POST selection code 105 selects an execution path #4 in FIG. 10 with reference to the ACPI register 57, the registers 59 and 61, and the S34 flag in the RTC memory 51, and then transfers the control to the S3 POST code 115.

Upon the completion of the POST processing, the S3 POST code 115 automatically transmits the hash value of the SSD password which has been stored in a secure area to the SSD 23 and unlocks the SSD 23. The automatic transmission of the SSD password is performed after checking that there is no unauthorized access in blocks 507 and 509, and therefore the SSD 23 is protected from eavesdropping devices.

In block 513, the POST selection code 105 checks whether the S34 flag is set in the RTC memory 51. Unless the S34 flag is set, the power state of the transition source is the S3 state and therefore the control shifts to block 555. If the S34 flag is set, the control shifts to block 601 of FIG. 8.

In block 555, the POST selection code 105 selects an execution path #5 in FIG. 10 with reference to the ACPI register 57, the registers 59 and 61, and the S34 flag in the RTC memory 51, and thereafter forcibly shuts down the system without displaying a prompt for a password input and transitions the system to the S5 state.

In block 601 of FIG. 8, the POST selection code 105 determines that an unauthorized access to the SSD 23 is detected at the time of returning from the S34 state with reference to the registers 59 and 61 and the S34 flag in the RTC memory 51, selects an execution path #2 in FIG. 10, and transfers the control to the basic POST code 107.

In block 603, the basic POST code 107 which has completed the POST processing transfers the control to the authentication code 109 and then the authentication code 109 requests the user to input a password. In block 605, if the user inputs a correct SSD password on the password input screen displayed by the authentication code 109, the control shifts to block 609. If the authentication is unsuccessful, the control shifts to block 607 and the boot stops. If the boot stops, the boot is enabled by restarting the Laptop PC 10 and inputting the correct SSD password or executing the BIOS setup code 119 to clear the SSD password.

In block 609, the authentication code 109, which has confirmed security by the input of the correct password, clears the tamper bit in the register 59 and sets a power bit in the register 61 in block 611. In block 613, the authentication code 109 resets the CPU 11 and then the CPU 11 executes the POST selection code 105 (time t7) and the control returns to block 415 of FIG. 6.

This time, the state of an unauthorized access indicated by the registers 59 and 61 is cleared. Therefore, the POST selection code 105 selects the execution path #1 in FIG. 10 with reference to the registers 59 and 61 and the S34 flag in the RTC memory 51, shifts to block 651 of FIG. 8 via block 510 from block 501, and then transfers the control to the simple POST code 111. The simple POST code 111 automatically transmits the hash value of the SSD password which has been stored in the secure area to the SSD 23 to unlock the SSD 23 in block 653. The automatic transmission of the SSD password is performed after checking that there is no unauthorized access in blocks 507 and 509, and therefore the SSD 23 is protected from eavesdropping of the password and data.

Figure 6:
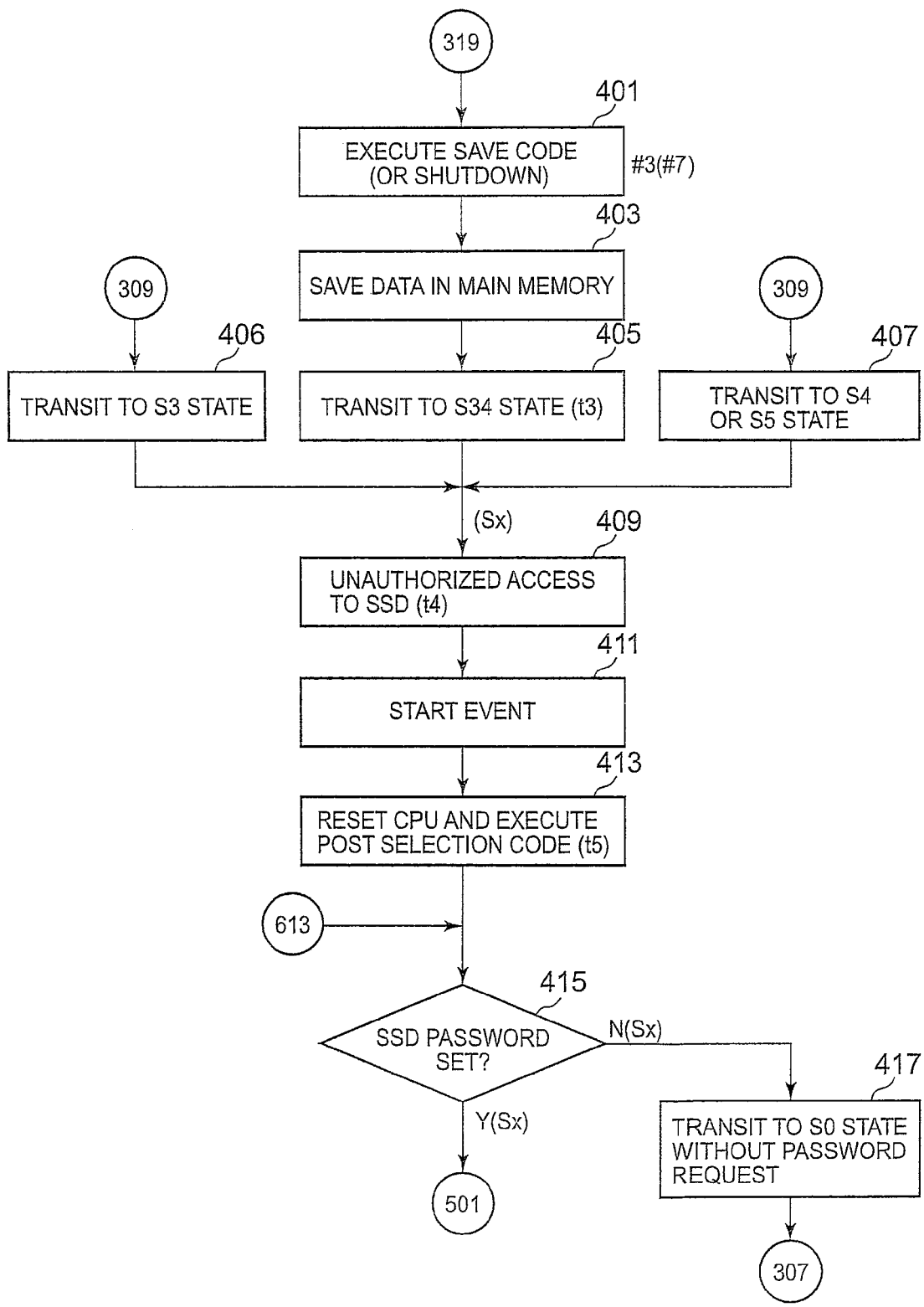

In block 655, the simple POST code 111 returns the memory state of the main memory 15, which has been saved in the SSD 23 in block 403 of FIG. 6, to the main memory 15. In block 657, the simple POST code 111 clears the S34 flag in the RTC memory 51. Although the data state of the Laptop PC 10 is the S3 state at this point, the power supply state is the HW_S0 state. After the completion of the data transfer, the simple POST code 111 transfers the control right to the OS in block 659. The OS recognizes that the power state of the transition source is the S3 state with reference to the ACPI register 57. Then, for transition to the S0 state, the OS returns the system context 213 to the devices having been reset, in cooperation with the device driver and the BIOS as needed, and then returns to block 307 of FIG. 5 (time t8).

According to the procedure from FIG. 5 to FIG. 8, the OS recognizes that the system is transitioned to the S3 state in block 309 of FIG. 5 and performs return processing from the S3 state in block 659 of FIG. 8. Since the BIOS performs all of this processing, the OS does not need to recognize that the BIOS executes the processing and therefore there is no need to add modifications to the OS. If the S3 POST code 115 is executed as in the transition from the S3 state to the S0 state at the time of transition from the S34 state to the S0 state, the system is forcibly shut down when an unauthorized access to the SSD 23 is detected.

In this respect, in the embodiment, unless any unauthorized access is detected, the simple POST code 111 which automatically transmits the password to the SSD 23 is executed to enable a return in a short time, and only in the case of a detection of an unauthorized access, the basic POST code 107 and the authentication code 109 are executed to request a password input, thereby preventing the edit data before the transition to the S34 state from disappearing while protecting the password.

Although the method of protecting a password and data by giving an example of a case of returning from the S34 state hereinabove, the present invention is also applicable to overall POST codes which do not request the user to input a password by automatically transmitting the password in order to boot the Laptop PC 10 in a shorter time than the basic POST code 107 at the return from the S4 state. Moreover, although an example is illustrated where the control is transferred to the basic POST code 107 to request a password input in the case where an unauthorized access is detected, in the present invention, the BIOS code is able to be configured to request the user to input a password in the case where an unauthorized access is detected and to automatically transmit the password in the case of no detection of an unauthorized access so that the boot is completed in a short time. The BIOS configured in this manner is allowed to return the system to the S0 state without resetting the CPU 11 after the return to the HW_S0 state at time t5 in FIG. 10.

As has been described, the present disclosure provides a method and apparatus for protecting a password for a non-volatile memory within a computer.

Those skilled in the art will appreciate that the mechanisms of the present invention are capable of being distributed as a program product in a variety of computer readable device such as compact discs and digital video discs.

While the disclosure has been particularly shown and described with reference to a preferred embodiment, it will be understood by those skilled in the art that various changes in form and detail may be made therein without departing from the spirit and scope of the disclosure.

What is claimed is:

1. A method comprising:
storing a password in a non-volatile memory of a computer;
transitioning said computer to a power saving state;
determining whether a transition source is in a S3 state or in a S34 state in response to detecting an unauthorized access when said non-volatile memory is electrically disconnected from said computer, wherein said S3 state is a suspend state in which an operating system of the computer saves system contexts to a volatile memory of said computer and stops power supplies within the computer that are unnecessary for memory retention of said volatile memory, and said S34 state is a state in which said operating system transitions said computer into said S3 state and a BIOS of said computer thereafter transitions said power saving state from said S3 state to an S4 state, a hibernation state wherein contents of said volatile memory are stored into said non-volatile memory and power of said computer is turned off determining whether a transition source is in a S3 state or in a S34 state;
forcing said computer to shut down in response to a determination that said transition source is said S3 state, forcing said computer to shut down;
requesting a password input from a user in response to a determination that said transition source is said S34 state, requesting a password input from a user;
returning to a power-on state from said power saving state in response to a success in authentication of said input password.

2. The method of claim 1, wherein said password requested to be input is identical to said password stored in said non-volatile memory.

3. The method of claim 1, further comprising transmitting a password to said non-volatile memory without requesting said password input in response to no detection of said unauthorized access.

4. The method of claim 1, wherein said detecting said unauthorized access further includes detecting a power supply being required to start said computer has stopped.

5. A computer readable device having a computer program product for protecting a password of a computer having a non-volatile memory, said computer readable device comprising:

program code for storing said password in said non-volatile memory of said computer;

program code for transitioning said computer to a power saving state;

program code for determining whether a transition source is in a S3 state or in a S34 state in response to detecting an unauthorized access when said non-volatile memory is electrically disconnected from said computer, wherein said S3 state is a suspend state in which an operating system of the computer saves system contexts to a volatile memory of said computer and stops power supplies within the computer that are unnecessary for memory retention of said volatile memory, and said S34 state is a state in which said operating system transitions said computer into said S3 state and a BIOS of said computer thereafter transitions said power saving state from said S3 state to an S4 state, a hibernation state wherein contents of said volatile memory are stored into said non-volatile memory and power of said computer is turned off;

program code for forcing said computer to shut down in response to a determination that said transition source is said S3 state;

program code for requesting a password input from a user and returning to a power on state from said power saving state in response to a success in authentication of said input password in response to a determination that said transition source is said S34 state.

6. The computer readable device of claim 5, wherein said password requested to be input is identical to said password stored in said non-volatile memory.

7. The computer readable device of claim 5, further comprising program code for transmitting a password to said non-volatile memory without requesting said password input in response to no detection of said unauthorized access.

8. The computer readable device of claim 5, wherein said program code for detecting said unauthorized access further includes program code for detecting a power supply being required to start said computer has stopped.

* * * * *